(12) United States Patent
Heath

(10) Patent No.: US 7,019,773 B1
(45) Date of Patent: Mar. 28, 2006

(54) VIDEO MOSAIC

(75) Inventor: Thomas S. Heath, Syracuse, NY (US)

(73) Assignee: PRC Inc., McLean, VA (US)

( * ) Notice: Subject to any disclaimer, the term of this patent is extended or adjusted under 35 U.S.C. 154(b) by 0 days.

(21) Appl. No.: 09/577,487

(22) Filed: May 25, 2000

(51) Int. Cl.
H04N 5/225 (2006.01)

(52) U.S. Cl. .................... 348/218.1; 348/36; 348/144; 348/252; 382/194; 382/199; 382/294; 382/302

(58) Field of Classification Search ................ 348/36, 348/143, 144, 218.1, 252; 382/194, 199, 382/294, 302
See application file for complete search history.

(56) References Cited

U.S. PATENT DOCUMENTS

| | | | | |
|---|---|---|---|---|
| 5,629,988 A | * | 5/1997 | Burt et al. .................. | 382/276 |
| 5,657,402 A | * | 8/1997 | Bender et al. .............. | 382/284 |
| 5,995,095 A | * | 11/1999 | Ratakonda ............... | 715/500.1 |
| 5,999,662 A | * | 12/1999 | Burt et al. .................. | 382/284 |
| 6,011,558 A | * | 1/2000 | Hsieh et al. ................ | 345/629 |
| 6,268,884 B1 | * | 7/2001 | Yagi et al. .................. | 348/252 |
| 6,512,857 B1 | * | 1/2003 | Hsu et al. ................... | 382/294 |
| 6,549,681 B1 | * | 4/2003 | Takiguchi et al. .......... | 382/294 |
| 6,597,801 B1 | * | 7/2003 | Cham et al. ................ | 382/103 |

OTHER PUBLICATIONS

Technical Report No. RL-TR-96-21 entitled "Multiframe Integration for High Resolution Video Stills", by Dr. Robert L. Stevenson and Dr. Richard R. Schultz, Feb. 1996, pp. 1-44.

* cited by examiner

Primary Examiner—Ngoc-Yen Vu
Assistant Examiner—Chriss S. Yoder
(74) Attorney, Agent, or Firm—Lowe Hauptman & Berner, LLP

(57) ABSTRACT

The present invention is directed to a system and method for building a video mosaic from a sequence of video images. Advantageously, the present invention can quickly and easily align each image by performing an image registration. The image registration includes detecting edges of structures and determining regions of interest. Once regions of interest are determined, then the distance from the center of the video image to the region of interest can be determined and from that determined data, the video images can be aligned.

20 Claims, 11 Drawing Sheets

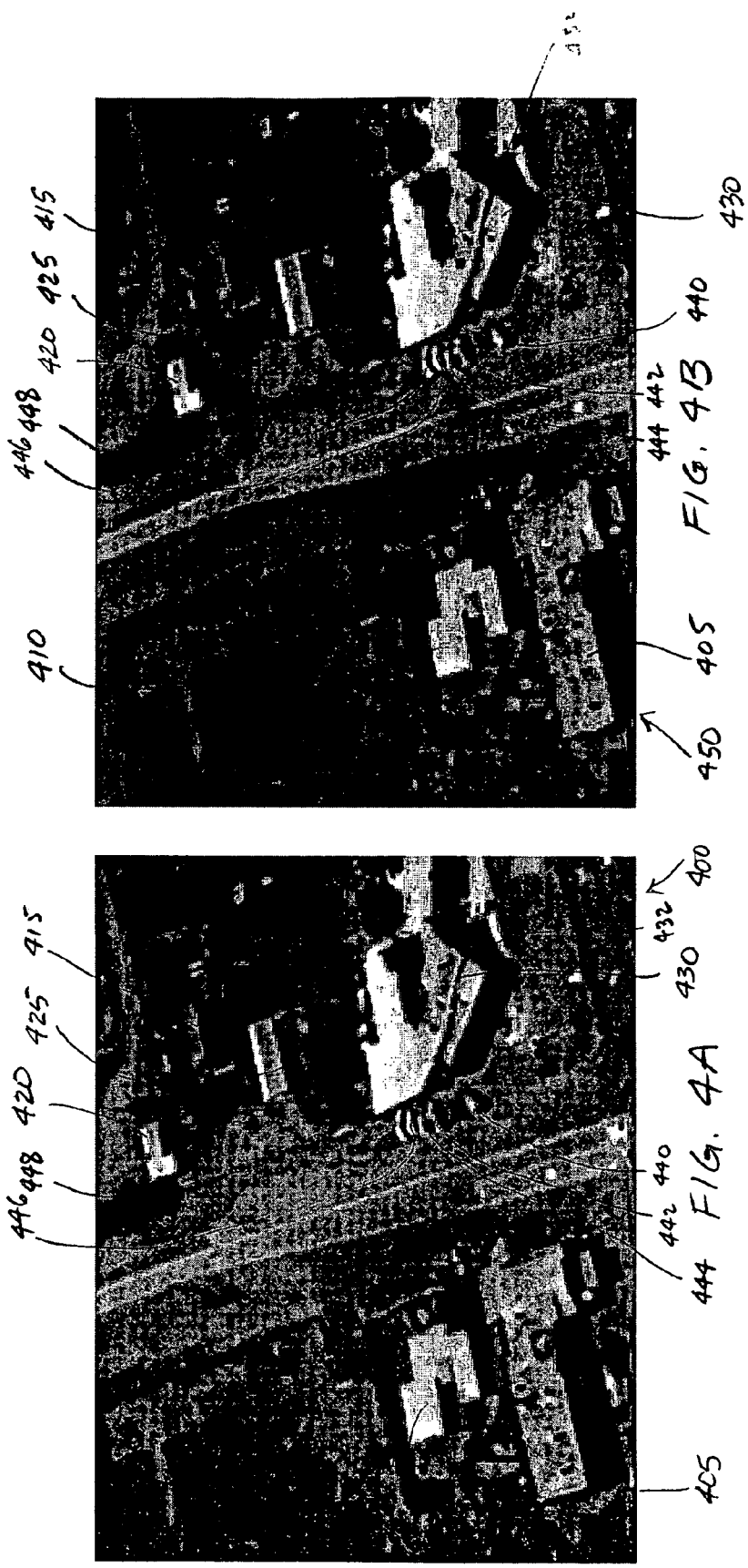

Consecutive Edge Detected Frames

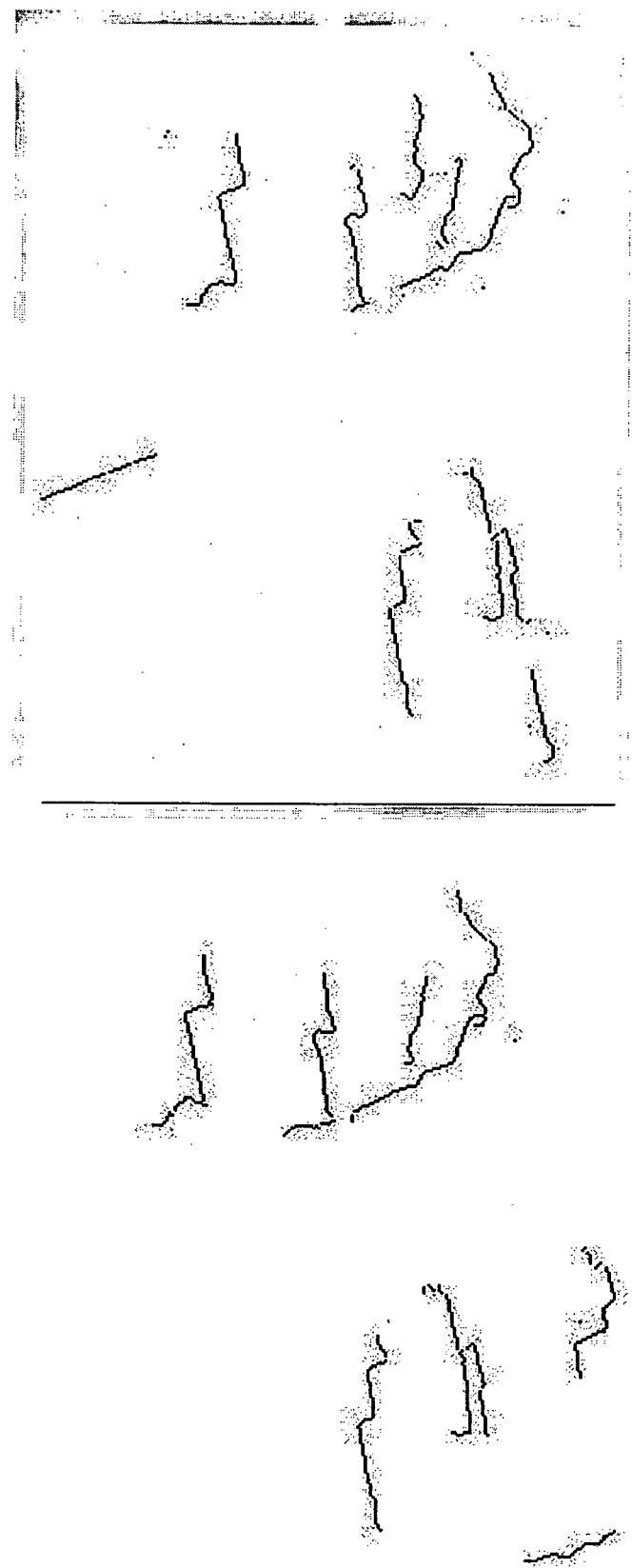

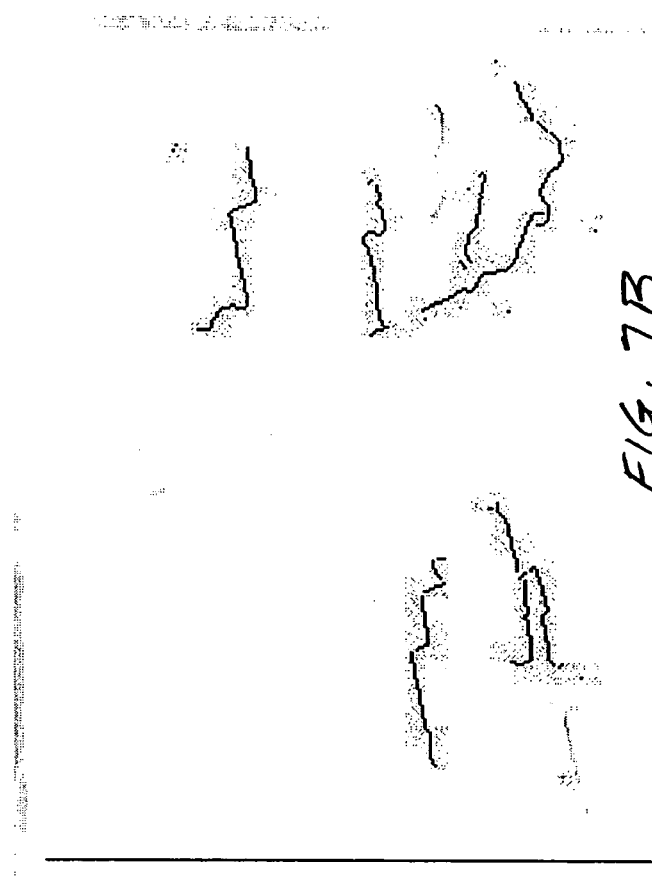
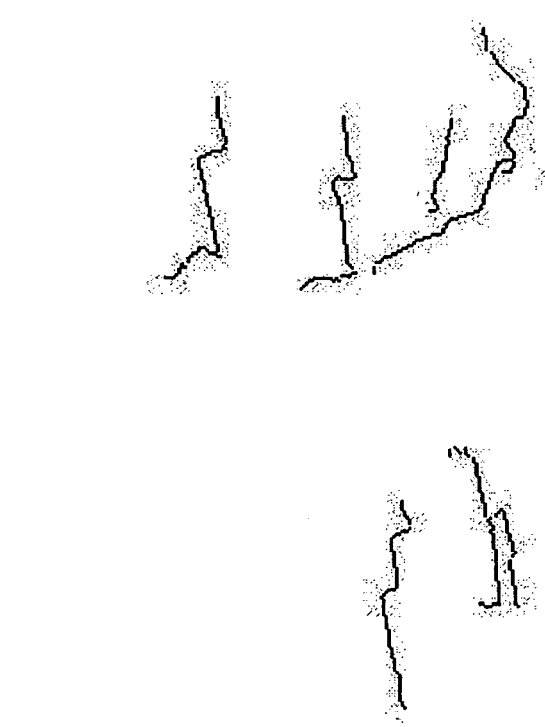
FIG. 7B
FIG. 7A
Consecutive Frames Showing Matched Structures

VIDEO MOSAIC

GOVERNMENT LICENSE RIGHTS

The U.S. Government has a paid-up license in this invention and the right in limited circumstances to require the patent owner to license others on reasonable terms as provided for by the terms of Contract No. F3002-94-C-0075 awarded by the Air Force Research Laboratory (AFRL).

RELATED APPLICATION

The present application is related to co-pending patent application Ser. No. 09/577,478 entitled "IMAGE ENHANCEMENT", by the instant inventor which is assigned to the instant assignee and filed on even date herewith and is hereby incorporated by reference in its entirety into this specification in its entirety.

FIELD OF THE INVENTION

The present invention relates generally to systems that process images, and more particularly, to a system and method that automatically generates a video mosaic from individual images.

BACKGROUND OF THE INVENTION

Until recently, image processing systems have generally processed images, such as frames of video, still photographs, and the like in an individual manner. After processing, the individual images are combined to form a mosaic, i.e., an image that contains a plurality of individual images. Additional image processing is performed on the mosaic to ensure that the seams between the images are invisible such that the mosaic looks like a single large image. The alignment was previously done manually by a technician to remove the seams. In such computer aided processing systems, the technician manually selects processed images, manually aligns those images, and a computer applies various images combining processes to the images to remove any seams or gaps between the images.

More recently, systems for automatically aligning images to form a mosaic image have started to gain acceptance. One such system is disclosed in U.S. Pat. No. 5,999,662. In the '662 patent, the image alignment process automatically aligns one input image to another input image, an input image to an existing mosaic (generated from previously occurring input images) such that the input image can be added to the mosaic, or an existing mosaic to an input image. In each of these instances, the coordinate system of the aligned images is either the coordinate system of the input image, the coordinate system of the mosaic, or an arbitrary reference coordinate system. The input image in mosaic can be aligned to one another within an image pyramid framework. As such the system converts both the input image and the mosaic into Laplacian image pyramids in the alignment processes applied to levels within the respective pyramids. Consequently, the system uses a course-to-line image alignment approach that results in sub-pixel alignment accuracy. This process generates a pyramid of continuing lower resolution images. Interative registration of lower and higher resolution images yields final product.

The difficulty with the prior art can best be explained by referring to the zoom capabilities of the camera. The camera can zoom in or out. As the zooming occurs, a structure within a frame will change position relative to the image. For example, if the image has a tree and the tree is in the center of the image as the camera zooms in the camera is going to get apparently larger within the frame. As the camera zooms out the tree will become apparently smaller. The distances from the center will change the function of how far the camera is zoomed in or zoomed out. This presents a problem with the prior art in trying to register from frame to frame. The sequence of pixels in one frame is going to be a difference sequence of pixels in another frame. Further, the prior art system disadvantageously requires special hardware.

SUMMARY OF THE INVENTION

It is, therefore, an object of the present invention to provide a method and system to align a sequence of frames to form a video mosaic.

It is another object of the present invention to measure the distance from the center of the image to an object where the change in camera zoom equals the change in distance over time.

The present invention is directed to a system and method for building a video mosaic from a sequence of video images. Advantageously, the present invention can quickly and easily align each image by performing an image registration. The image registration includes detecting edges of structures and determining regions of interest. Once regions of interest are determined, then the distance from the center of the video image to the region of interest can be determined and from that determined data, the video images can be aligned.

These and other objects of the present invention are achieved by a computer-implemented method of creating a video mosaic. Individual frames of imagery are extracted which were taken from a video camera. Commonality is identified from one individual frame to the next. The individual frames are overlapped and an image representing a continuous area is displayed.

The foregoing and other objects of the present invention are achieved by a computer architecture which includes extracting means for extracting individual frames of imagery taken from a video camera. Identifying means are provided for identifying commonality from one individual frame to the next. Overlapping means are provided for overlapping the individual frames and displaying an image representing a continuous area.

The foregoing and other objects of the present invention are achieved by an article comprising at least one sequence of machine executable instructions on a medium bearing the executable instructions in machine form, wherein execution of the instructions by one or more processors causes the one or more processors to extract individual frames of imagery taken from a video camera, identify commonality from one individual frame to the next, and overlap the individual frames and displaying an image representing a continuous area.

The foregoing and other objects of the present invention are achieved by a computer system including a processor and a memory coupled to the processor, the memory having stored therein sequences of instructions, which, when executed by the processor, causes the processor to perform the steps of extracting individual frames of imagery taken from a video camera, identifying commonality from one individual frame to the next, and overlapping the individual frames and displaying an image representing a continuous area.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 4A and 4B are illustrations of a sequence of two consecutive video frames;

FIGS. 6A and 6B are illustrations of a sequence of consecutive frames with structures identified corresponding to FIGS. 5A and 5B;

FIGS. 7A and 7B are illustrations of consecutive frames showing matched structures;

BEST MODE FOR CARRYING OUT THE INVENTION

Generally, a mosaic is a data structure that melds visual information from a set of images taking a plurality of time instance, view points, or fields of view. The various images are aligned and combined to form, for example, a panoramic view of a scene such as a single still image. Importantly, a mosaic is not limited to a combination of distinct images, but may also be a combination of mosaics.

There are two types of mosaics: dynamic mosaics and static mosaics. Dynamic mosaics are time variant and they are recursively updated over time with new imagery. As such, a series of input images (e.g., video frames) are combined one at a time with the other images in the series to produce the dynamic mosaic. Thereafter, the system aligns and combines each new input image with the previous mosaic, i.e., the mosaic is updated. In a static mosaic, the content of the mosaic is time invariant. For example, a series of existing input images are divided into sub-sequences of images. The individual images in each sub-sequence are aligned with one another and combined into a static mosaic. The static mosaic is not updated with new information, i.e., the content of the mosaic is static.

A method and apparatus for creating a video mosaic are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
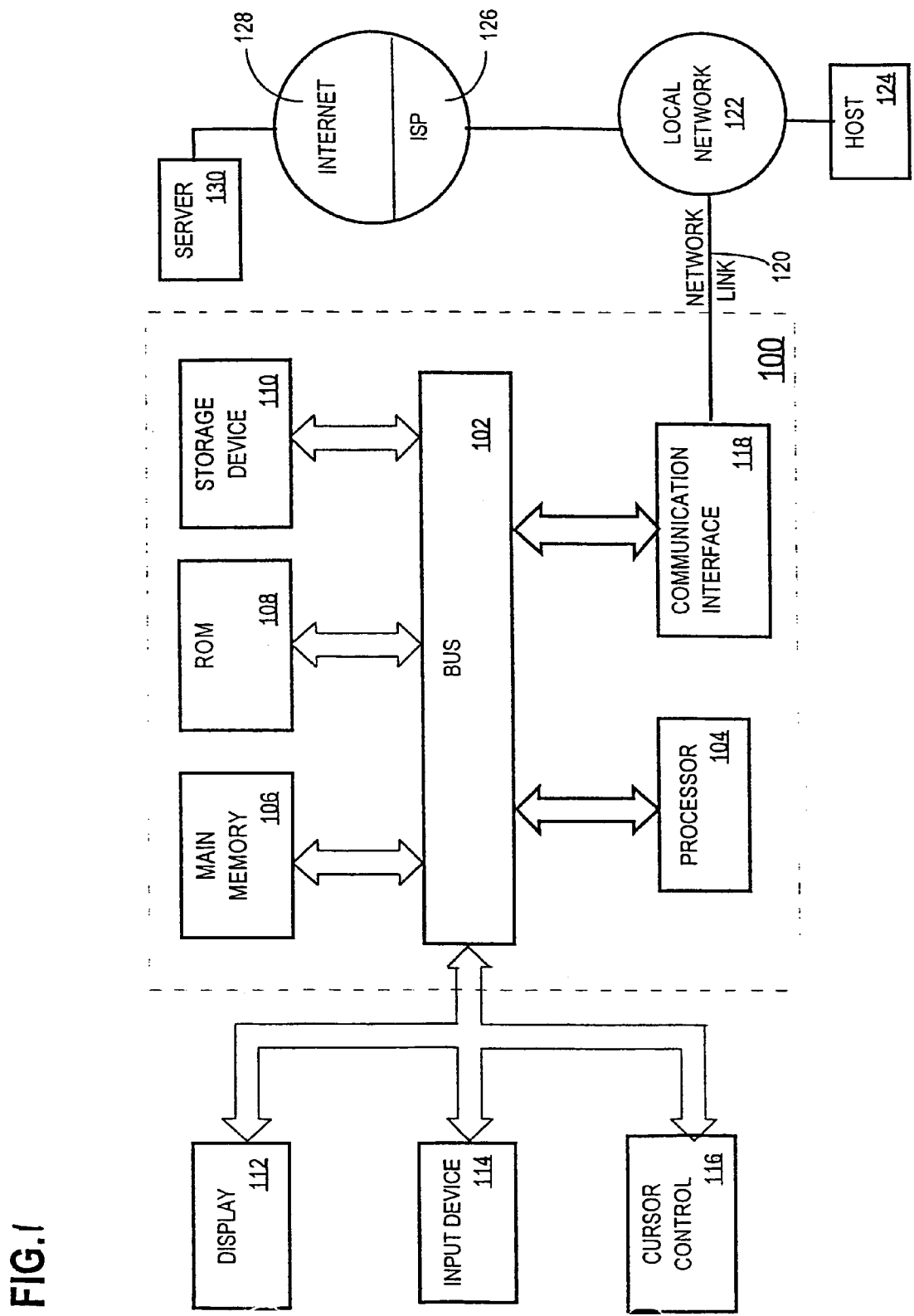
FIG. 1 is a high level block diagram of a computer architecture usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.) allowing the device to specify positions in a plane.

The invention is related to the use of a computer system 100, such as the illustrated system, to display video mosaics. According to one embodiment of the invention, a video mosaic is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the video frames from a library. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

Figure 2:
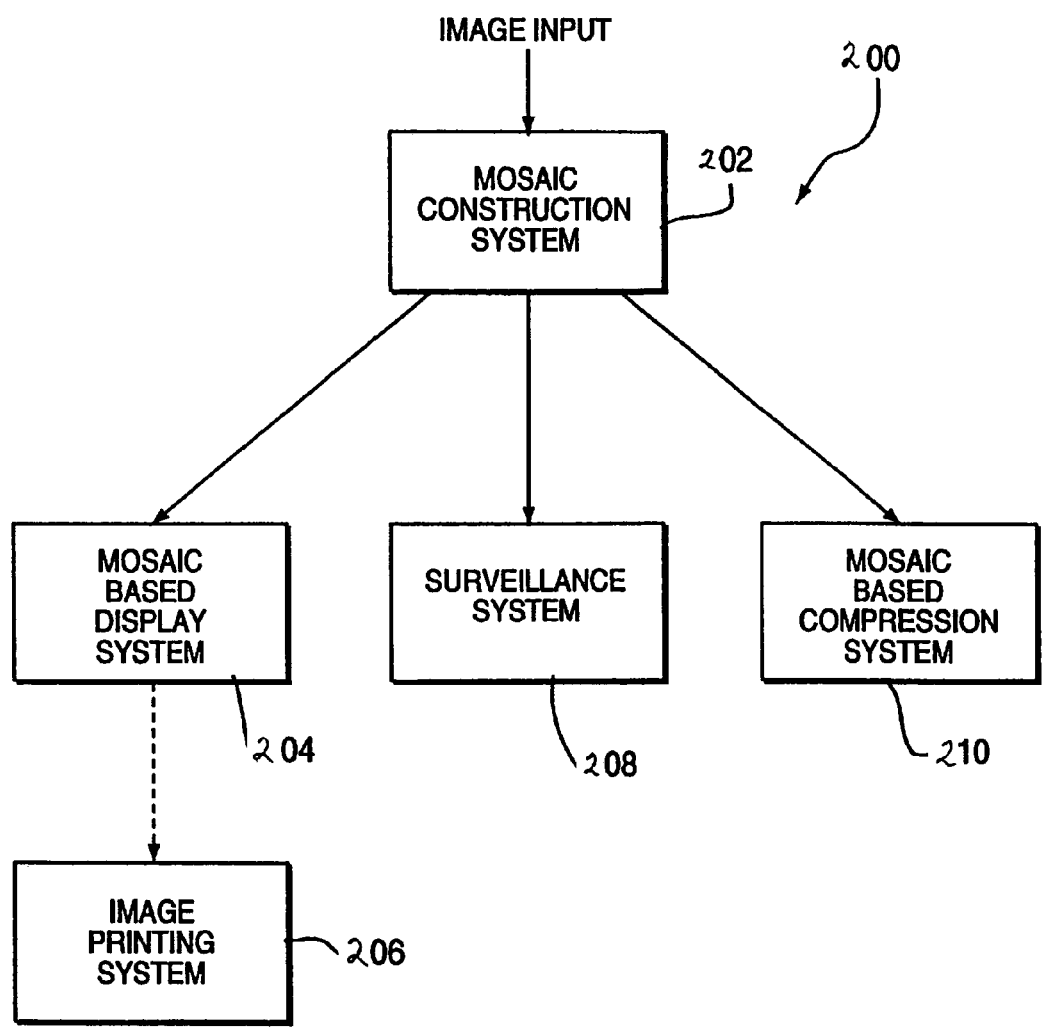
FIG. 2 depicts a block diagram of a system for automatically constructing a mosaic and various systems for utilizing the mosaic in image compression, surveillance, and image display.

FIG. 2 depicts a block diagram of a mosaic based image processing system 200 that contains a mosaic construction system 202, as well as one or more application systems 204, 206, 208, 210 for a mosaic. Specifically, the application systems include a mosaic base display system 204 which includes a mosaic based printing system 206, mosaic based surveillance system 208 and a mosaic based compression system 210.

Figure 3A:
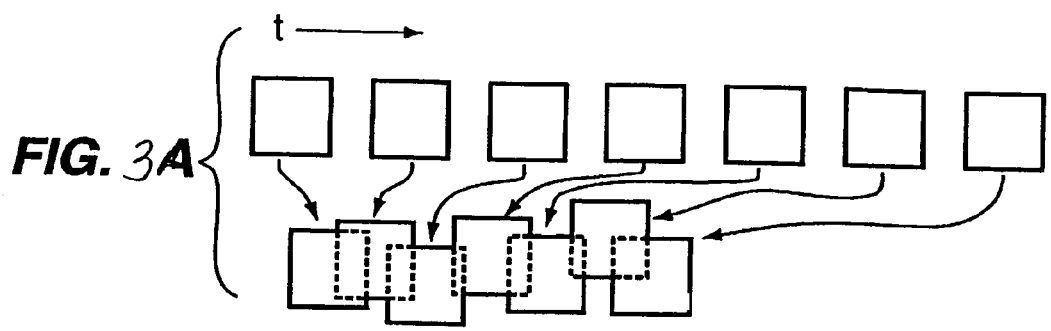
FIGS. 3A, 3B, and 3C respectively depict a schematic rendering of batch mosaic construction sequencing, recursive mosaic construction sequencing and hierarchical mosaic construction.
Figure 3B:
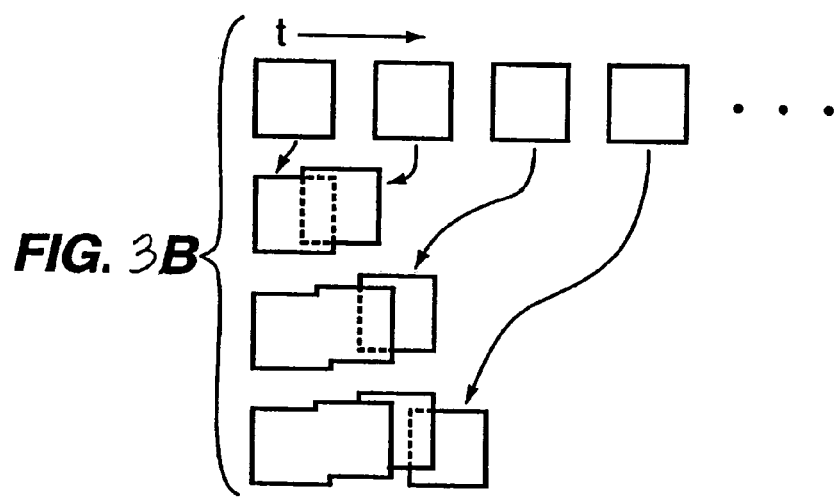
Figure 3C:
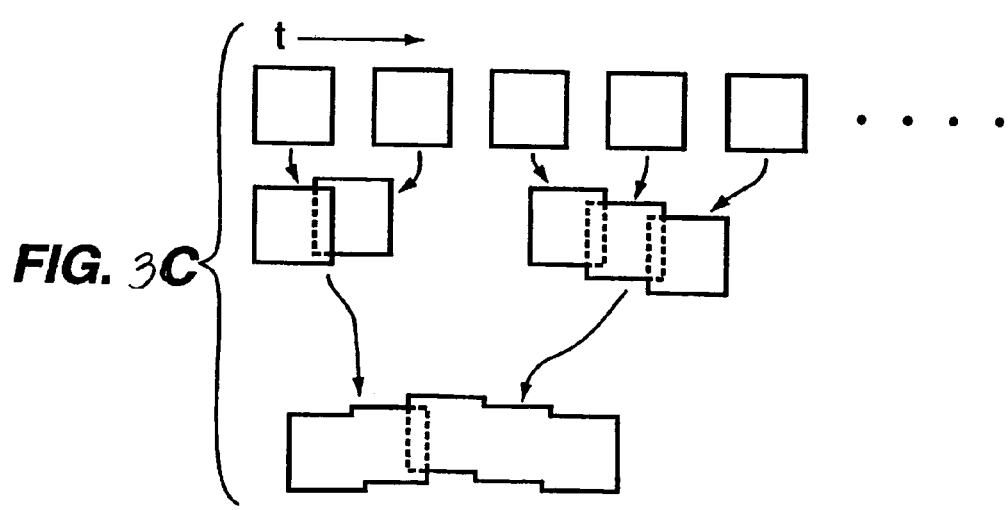

The mosaic construction system 202 has as an input a series of images (see FIGS. 4A and 4B). These images can be a video frame sequence, a series of satellite infra-red or visible photographs, a sequence of ariel photographs or any other series of images that, when aligned with one another, form a mosaic. The images may be provided in real time, i.e., the images may be provided from, for example, a video camera, which typically operates at 30 frames per second. As depicted in FIG. 2, the system forms the mosaic using various input image and mosaic construction sequencing processes including batch (FIG. 3A) recursive (FIG. 3B) and hierarchical (FIG. 3C) sequencing.

Returning to FIG. 2, the mosaic is used by one or more of the application systems. For example, the mosaic based display system 204 utilizes special utilization storage and manipulation techniques and enable a system user to rapidly have a mosaic displayed on a computer monitor and enable the user to manipulate the displayed mosaic. The mosaic base displayed removes the image source, (e.g., camera) motion from the mosaic image (i.e., the image is stabilized). Such a display is especially useful when displaying ariel photographs taken from, for example, a helicopter or unmanned ariel of vehicle (UAV). The moving display provides the user with a sense of motion over the depicted terrain without any camera jitter.

In addition to displaying the mosaic, or portions thereof on a computer monitor, this mosaic based display system may optionally be used in conjunction with an image printing system 206. The printing system 206 is capable of generating high-resolution color, monochrome black and white or infrared still images of the mosaic or any portion thereof.

The surveillance system 208 uses a mosaic for detection of motion, for example, for security purposes or motion detection on a battlefield. Generally, a panoramic view of an area of interest is captured by, for example, a high-resolution video camera. The mosaic construction system 202 generates a single high-resolution mosaic of the entire panoramic view. This mosaic is used as a reference view. Subsequent frames captured by the video camera are compared to the reference view.

The mosaic based compression system 210 uses the mosaic as a basis for efficiently compressing image information for a transmission through a low band with a transmission channel. An alternative of the compression system is used to compress image information for efficient information for efficient storage within a storage medium such as a disk drive for compact disks.

As depicted in FIGS. 4A and 4B there are a plurality of structures 405, 410, 420, 425, 430, 440, 442, 444, 446 and 448. As depicted in photos 400 and 450, a building structure 405 is located at the lower left hand corner of both frames. As is evident from frames 400 and 450, building structure 405 is not in the same location in each of the consecutive video frames 400, 450 because of the motion of the camera. Structures 415, 420 and 425 are building structures which are in the upper right hand portion of video frames 400 and 450. Structure 430 is a building structure having multiple sides and having a v-shaped portion 432. A plurality of automobiles 440–448 are parked adjacent to building structure 430.

Figures 5A, 5B:
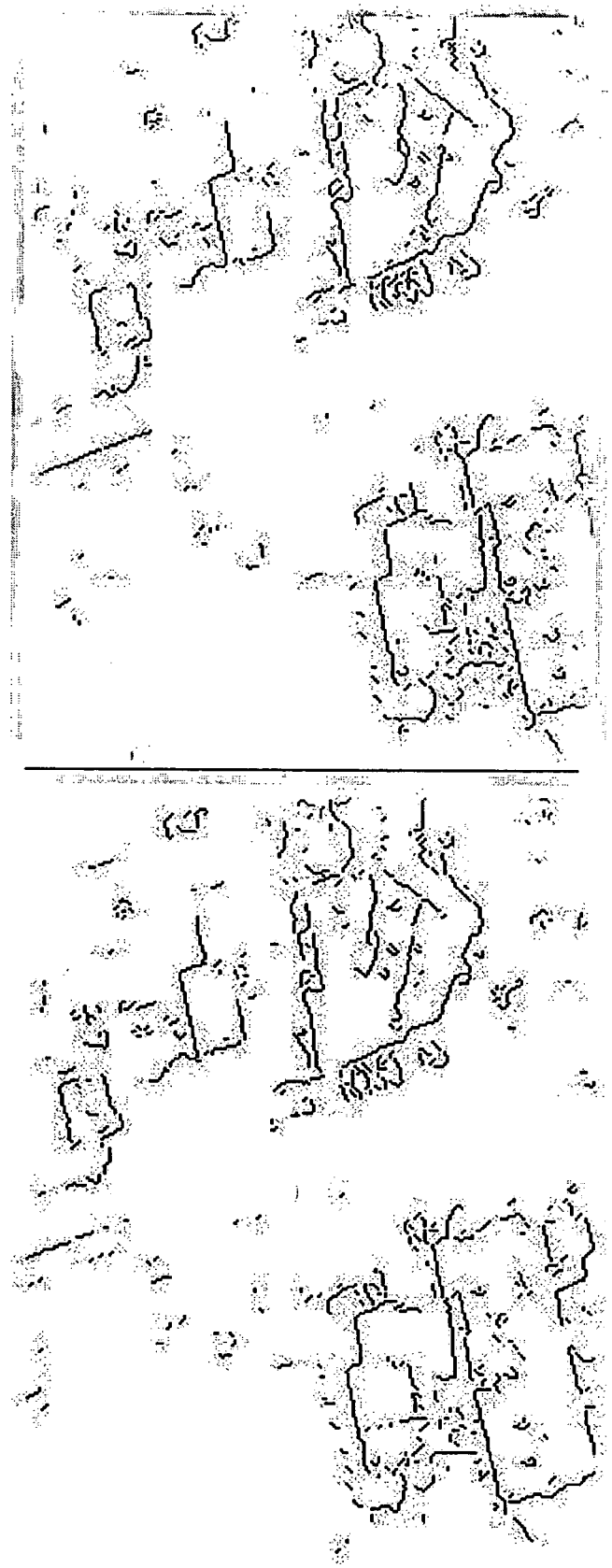
FIGS. 5A and 5B are illustrations of a sequence of two consecutive edge detected frames corresponding to FIGS. 4A and 4B.

Referring now to FIGS. 5A and 5B, the various structures described in FIGS. 4A and 4B have been detected using an edge detecting process by detecting the change in intensity from one pixel to adjacent pixels. This will be described in greater detail below.

FIGS. 6A and 6B depict consecutive frames with structures having been identified. FIGS. 7A and 7B depict consecutive frames showing matched structures according to the present invention. FIGS. 4A–7B will now be explained with reference to the process of the present invention.

Figure 8A:
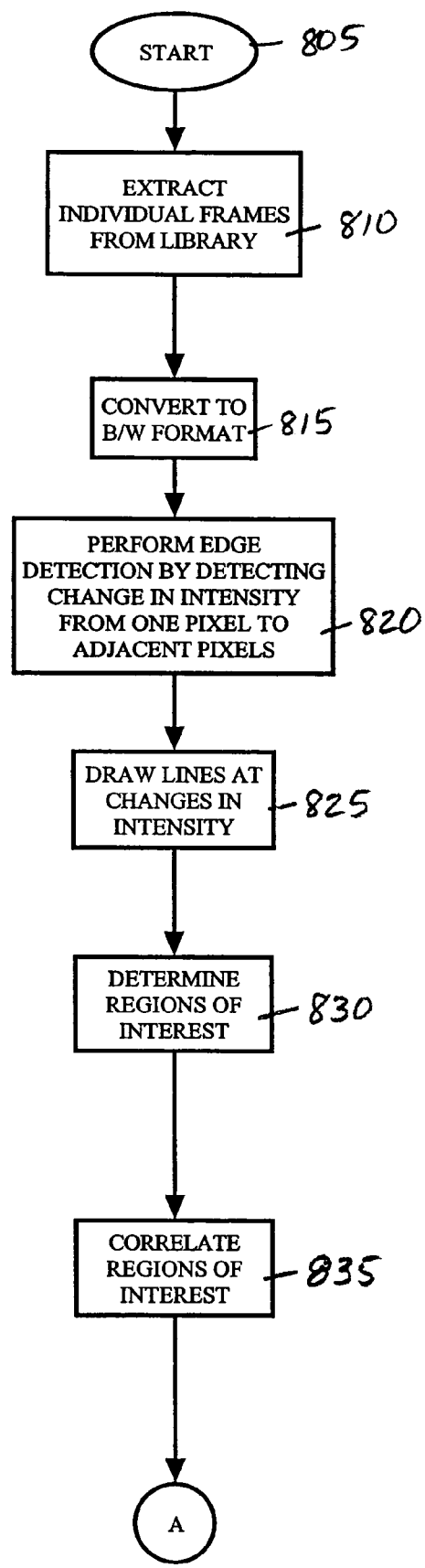
FIGS. 8A and 8B are flow diagrams according to the present invention of constructing a video mosaic.
Figure 8B:
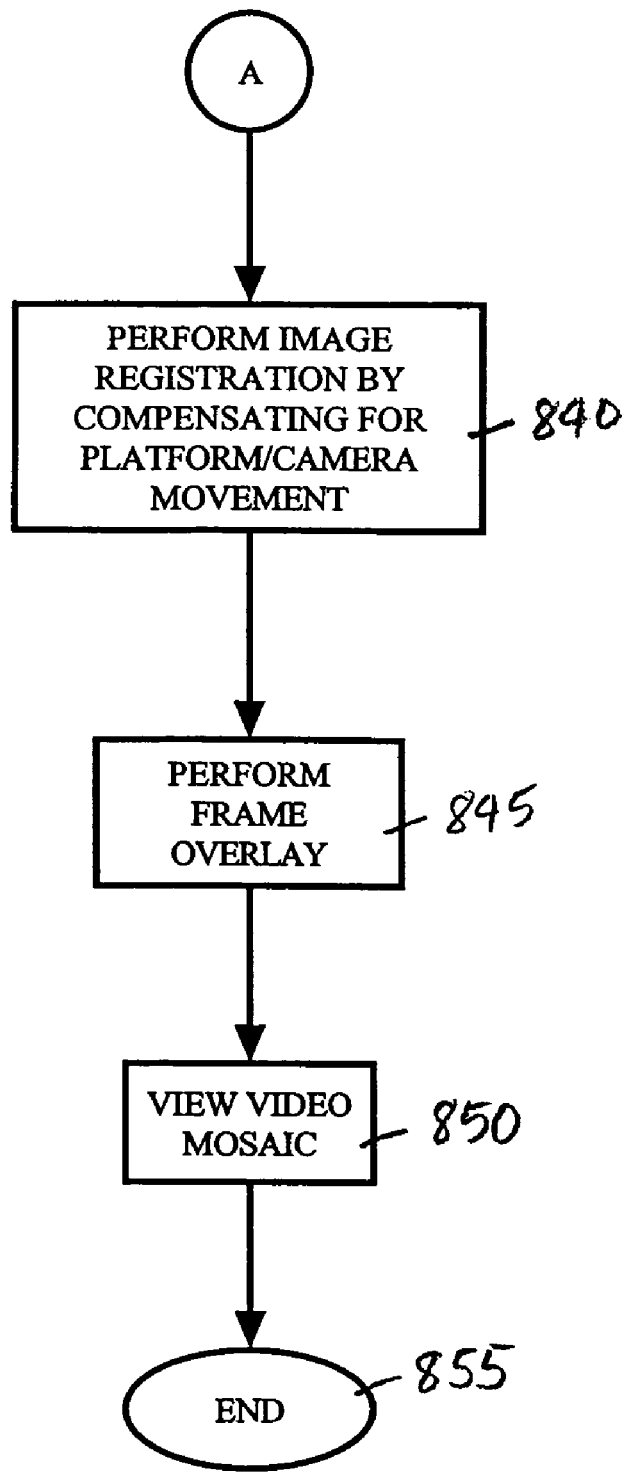

Refer now to FIGS. 8A and 8B showing the process of the present invention. At step 805 the process is started. A step 810, individual frames are extracted from the library. As depicted in FIGS. 4A and 4B, frames 400 and 450 were extracted from the library. At step 815, the extracted individual frames are converted to a black and white format. At step 820, edge detection is performed by detecting change and intensity from one pixel to adjacent pixels. As depicted in FIGS. 5A and 5B, the outlines of various structures are detected. At step 825, lines are drawn at changes of intensity as depicted in FIG. 5. At step 830, regions of interest are determined. At step 835, the regions of interest are correlated as explained with reference to FIGS. 9A and 9B. At step 840, image registration is performed by compensating for platform/camera movement. The registration process accounts for motion of the camera by determining the frame-to-frame x-y offsets, zoom and rotation. At step 845, frame overlay is performed. At step 850, the video mosaic can be viewed. At step 855 the process is ended.

Figure 9:
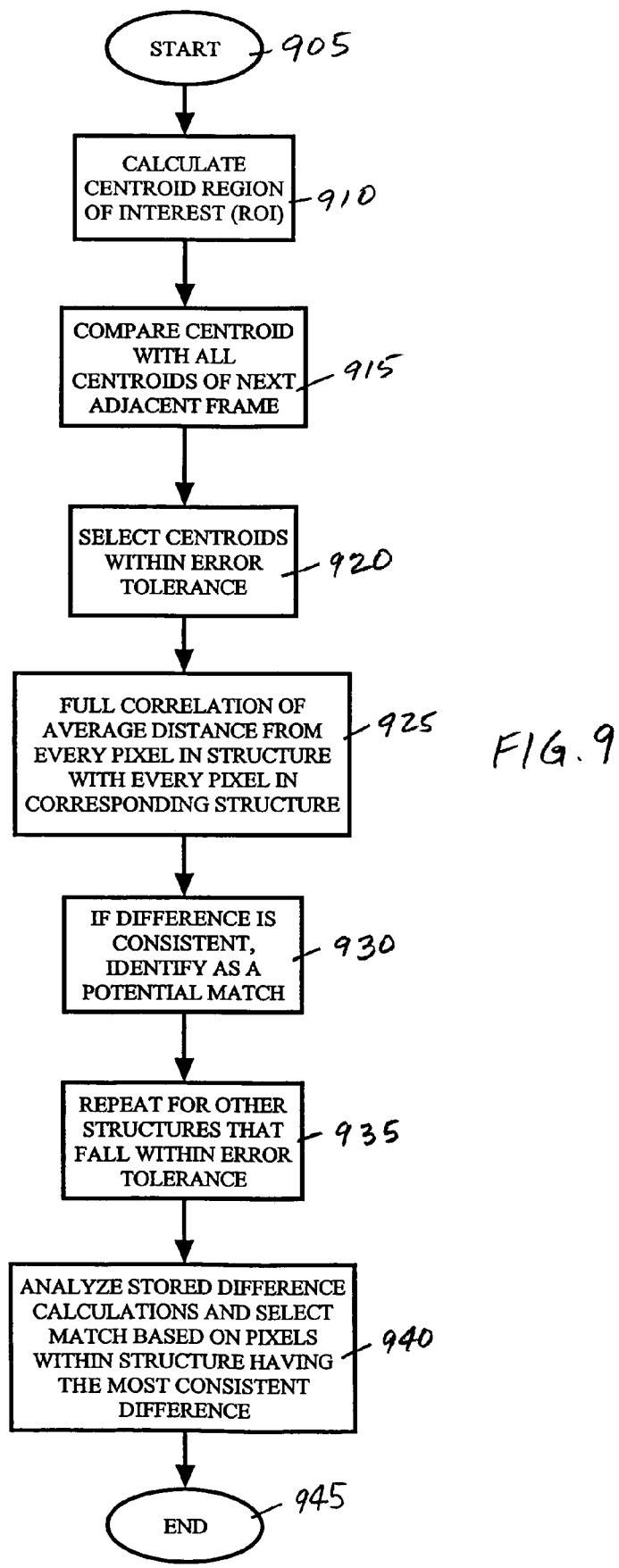
FIG. 9 is a flow diagram of matching identified structures.

Refer now to FIG. 9 were at step 905 the process is started. At step 910, the centroid region of interest (ROI) is calculated. At step 915, the centroid is compared with centroids of next to adjacent frame. At step 920, centroids are selected which are within ariel tolerances. At step 925, there is a full correlation of average distance from every pixel and corresponding structure. At step 930, if the difference is consistent the structure is identified as a potential match. At step 935, steps 905–930 are repeated for other structures that fall within error tolerance. At step 940, the stored difference calculations are analyzed and select matches are based on pixels within structure having the most consistent differences. The analysis includes looking for frame-to-frame location as indicated by the difference calculation. This consistency will yield x-y translation, rotation and focal length changes.

Figure 10:
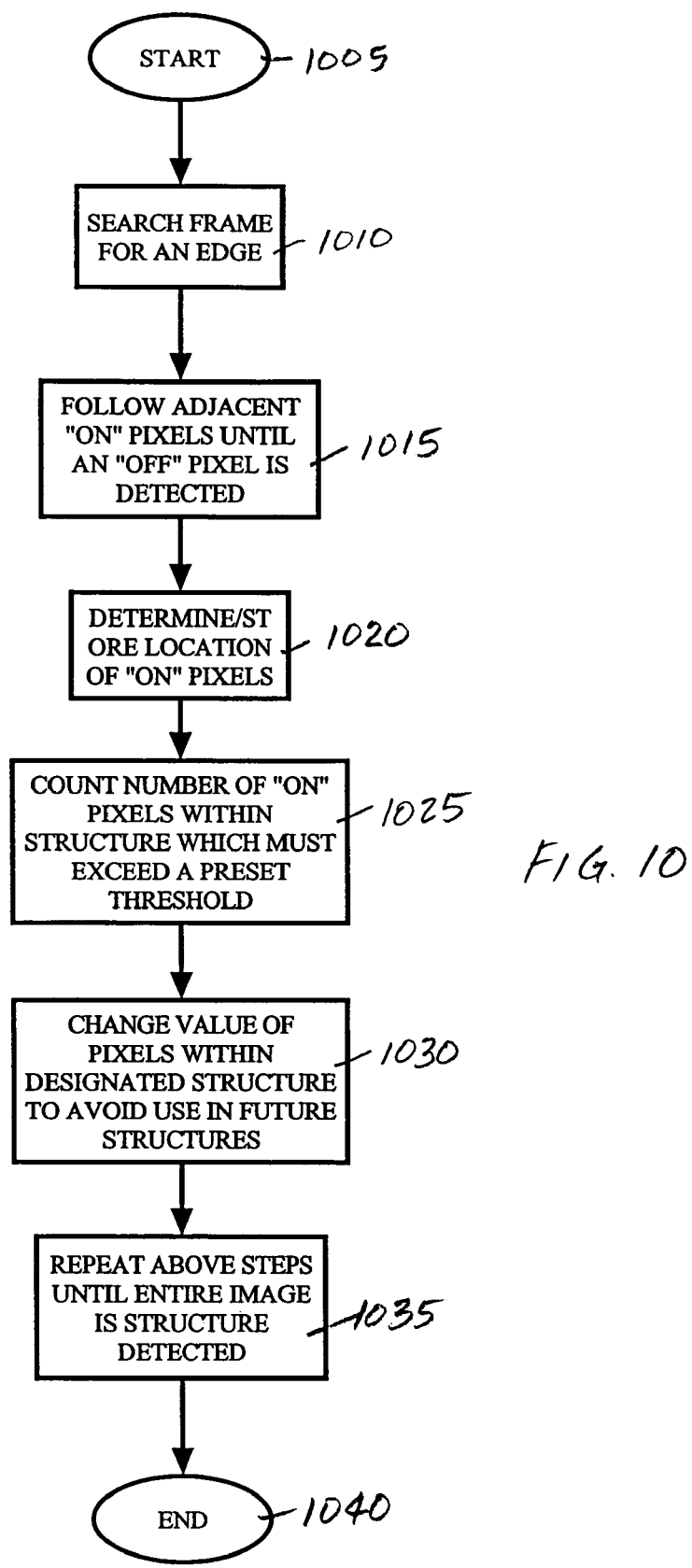
FIG. 10 is a flow diagram of edge detection.

Now referring to FIG. 10, the process is started at step 1005. At step 1010, the frame is searched for an edge. At step 1015, adjacent "on" pixels are followed until an "off" pixel is detected. At step 1020, it is determined the locations of the on pixels and these locations are stored. At step 1025, the number of on pixels is counted within the structure which must exceed a preset threshold. At step 1030, the value of the pixels within a designated structure is changed to avoid use in future structures. At step 1035, steps 1005–1030 are repeated until the entire images in structure detected. At step 1040, the process is ended.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer-implemented method of creating a video mosaic, comprising:
   extracting a first individual frame and a second individual frame of imagery from a series of video frames;
   detecting edges in the first individual frame and the second individual frame;
   following adjacent on pixels until an off pixel is detected;
   counting a number of on pixels and if above a preset threshold, designate as a structure;
   repeat said searching, said following, and said counting steps until entire frame is structure detected;
   determining regions of interest in the first individual frame and the second individual frame based on the detected edges;
   identifying commonality from the first individual frame to the second individual frame, including correlating determined regions of interest between the two individual frames by comparing each region of interest in the first individual frame to a region of interest in the second individual frame; and
   overlapping the individual frames based on the commonality identified from the first individual frame to the second individual frame and displaying an image representing a continuous area.

2. The method of claim 1, comprising compensating for platform/camera motion.

3. The method of claim 1, comprising storing the location of on pixels within each designated structure.

4. The method of claim 3, comprising changing value of pixels within a designated structure to avoid use in future structures.

5. The method of claim 1, comprising correlating regions of interest by comparing each region of interest to each other region of interest.

6. A computer architecture, comprising:
   extracting means for extracting a first individual frame and a second individual frame of imagery from a series of video frames;
   detecting means for detecting edges in the first individual frame and the second individual frame;
   means for following adjacent on pixels until an off pixel is detected;
   means for counting a number of on pixels and if above a preset threshold, designate as a structure;
   means for repeating said searching, said following, and said counting steps until entire image is structure detected;
   determining means for determining regions of interest in the first individual frame and the second individual frame based on the detected edges detected by the detecting means;
   identifying means for identifying commonality from the first individual frame to the second individual frame, including correlating determined regions of interest between the two individual frames by comparing each region of interest in the first individual frame to a region of interest in the second individual frame; and
   overlapping means for overlapping the individual frames based on the commonality identified by the identifying means from the first individual frame to the second individual frame and displaying an image representing a continuous area.

7. The computer architecture of claim 6, comprising compensating means for compensating for platform/camera motion.

8. The computer architecture of claim 6, comprising storing means for storing the location of on pixels within each designated structure.

9. The computer architecture of claim 8, comprising means for changing value of pixels within a designated structure to avoid use in future structures.

10. The computer architecture of claim 6, comprising correlating means for correlating regions of interest by comparing each region of interest to each other region of interest.

11. An article, comprising:
    at least one sequence of processor-executable instructions;

a computer-readable medium bearing the processor-executable instructions wherein execution of the instructions by one or more processors causes the one or more processors to:

extract a first individual frame and a second individual frame of imagery from a series of video frames;

detect edges in the fast individual frame and the second individual frame;

follow adjacent on pixels until an off pixel is detected;

count a number of on pixels and if above a preset threshold, designate as a structure;

repeat said detect, said follow, and said count instructions until the entire image is structure detected;

determine regions of interest in the first individual frame and the second individual frame based on the detected edges;

identify commonality from the first individual frame to the second individual frame, including correlating determined regions of interest between the two individual frames by comparing each region of interest in the first individual frame to a region of interest in the second individual frame; and overlap the individual frames based on the commonality identified from the first individual frame to the second individual frame and display an image representing a continuous area.

12. The article of claim 11, further comprising instructions causing the one or more processors to compensate for platform/camera motion.

13. The article of claim 11, further comprising instructions causing the one or more processors to store the location of on pixels within each designated structure.

14. The article of claim 13, further comprising instructions causing the one or more processors to change the value of pixels within a designated structure to avoid use in future structures.

15. The article of claim 11, further comprising instructions causing the one or more processors to correlate regions of interest by comparing each region of interest to each other region of interest.

16. A computer system, comprising:
a processor; and
a memory coupled to said processor, the memory having stored therein sequences of instructions, which, when executed by said processor, causes said processor to perform the steps of:

extracting a first individual frame and a second individual frame from a series of video frames;

detecting edges in the first individual frame and the second individual frame;

following adjacent on pixels until an off pixel is detected;

counting a number of on pixels and if above a preset threshold, designate as a structure;

repeat said searching, said following, and said counting steps until entire image is structure detected;

determining regions of interest in the first individual frame and the second individual frame based on the detected edges;

identifying commonality from the first individual frame to the second individual frame, including correlating determined regions of interest between the two individual frames by comparing each region of interest in the first individual frame to a region of interest in the second individual frame;

overlapping the individual frames based on the commonality identified from the first individual frame to the second individual frame and displaying an image representing a continuous area.

17. The computer system of claim 16, further comprising instructions causing the one or more processors to compensate for platform/camera motion.

18. The computer system of claim 16, further comprising instructions causing the one or more processors to store the location of on pixels within each designated structure.

19. The computer system of claim 18, further comprising instructions causing the one or more processors to change the value of pixels within a designated structure to avoid use in future structures.

20. The computer system of claim 16, further comprising instructions causing the one or more processors to correlate regions of interest by comparing each region of interest to each other region of interest.

* * * * *